United States Patent [19]
Pedersen et al.

[11] Patent Number: 5,806,561
[45] Date of Patent: Sep. 15, 1998

[54] HYDRAULIC CONTROL ARRANGEMENT

[75] Inventors: Poul Henning Holm Pedersen; Ole Vincentz Sørensen, both of Nordborg, Denmark

[73] Assignee: Danfoss A/S, Nordborg, Denmark

[21] Appl. No.: 913,944
[22] PCT Filed: Mar. 25, 1996
[86] PCT No.: PCT/DK96/00118
§ 371 Date: Sep. 18, 1997
§ 102(e) Date: Sep. 18, 1997
[87] PCT Pub. No.: WO96/30248
PCT Pub. Date: Oct. 3, 1996

[30] Foreign Application Priority Data

Mar. 29, 1995 [DE] Germany ......... 195 11 501.5

[51] Int. Cl.⁶ ............................................. F15B 13/10
[52] U.S. Cl. .................................... 137/567; 60/384
[58] Field of Search ........................ 60/384; 137/567

[56] References Cited
U.S. PATENT DOCUMENTS 2,134,399 10/1938 Dawson ................................. 60/429

Primary Examiner—Gerald A. Michalsky
Attorney, Agent, or Firm—Lee, Mann, Smith, McWilliams, Sweeney & Ohlson

[57] ABSTRACT

A hydraulic control arrangement is disclosed having a directional valve, a metering pump unit which has two metering pumps which are connected hydraulically in parallel and are operable mechanically in parallel, and a shut-off valve in a hydraulic connection between the two metering pumps, a pump connection and a tank connection which are connected to the metering pump unit by way of the directional valve, and also two working connections which are connected to the directional valve, a control inlet of the shut-off valve being connected to the pump connection. Such a control unit should be constructed to be user-friendly, especially for emergency operation. For that purpose, a safety valve arrangement is arranged between the control inlet of the shut-off valve and the directional valve.

11 Claims, 2 Drawing Sheets

HYDRAULIC CONTROL ARRANGEMENT

BACKGROUND OF THE INVENTION

The invention relates to a hydraulic control arrangement having a directional valve, a metering pump unit which has two metering pumps that are connected hydraulically in parallel and operable mechanically in parallel, and a shut-off valve in a hydraulic connection between the two metering pumps, a pump connection and a tank connection which are connected to the metering pump unit by way of the directional valve, and two working connections which are connected to the directional valve, a control inlet of the shut-off valve being connected to the pump connection.

Such a control arrangement is preferred for the steering of vehicles. In that case, the metering pumps and the directional valve are connected to a steering hand wheel or to a similar device. When the steering hand wheel is turned, the directional valve is displaced in the desired direction and the metering pump unit continues to convey hydraulic fluid until a steering motor connected to the working connections has reached the desired position. In normal, undisrupted operation, both metering pumps are active. They can convey an appropriately large volume of hydraulic fluid, which enables the steering motor to react rapidly to movements of the steering hand wheel.

The metering pumps can, however, also be used as auxiliary pumps in so-called "emergency operation", when the pressure at the pump connection falls or fails for whatever reason. In that case, the metering pumps are actually used to produce pressure in the hydraulic fluid. For that purpose, the energy required must be introduced by way of the steering hand wheel, that is to say generally by human muscle power. In order to facilitate the task for the operator, it is known, as disclosed in DE 22 28 531 C2, to provide a shut-off valve, with the aid of which the second metering pump is turned off in the event of a pressure failure at the pump connection. The operator then has to actuate only one metering pump. To achieve the same displacement of the steering motor, he then has to turn the steering hand wheel further. The effort required to do so is, however, smaller.

In normal operation such a system functions in a generally satisfactory manner. Even in emergency operation satisfactory results can be obtained in many cases.

However, disruptions can occur, particularly in emergency operation, that make what is already unpleasant operation still more difficult. For example, the shut-off valve, which turns off the second metering pump in the event of a pressure failure in the pump, may unexpectedly be opened again, that is to say it may make the connection between the two metering pumps, which causes an abrupt increase in the load on the steering hand wheel. There can be various causes for the opening of the valve. For example, there may be a sudden increase in pressure in the corresponding control line as a result of an external influence on the steering motor, as can happen, for example, if the steered wheel in a steered vehicle encounters an obstacle, a so-called "kick-back". In such cases, resistance to turning the steering hand wheel (or to moving the corresponding control means) increases virtually instantaneously, as a result of which not only an unpleasant, but even a health-endangering, impact may be passed on to the operator.

The problem underlying the invention is therefore to design the control arrangement so as to be user-friendly.

SUMMARY OF THE INVENTION

That problem is solved in a control arrangement of the type described at the outset by providing a safety valve arrangement between the control inlet of the shut-off valve and the directional valve.

That safety valve arrangement prevents pressure surges, which, in whatever manner, reach the pump connection-side inlet of the directional valve, from being transmitted to the shut-off valve. Instead they are intercepted by the safety valve arrangement and cannot result in a change in setting of the shut-off valve. Since the safety valve arrangement is arranged between the control inlet of the shut-off valve and the directional valve, the control inlet of the shut-off valve can still, as before, be connected to the pump connection so that in normal operation the connection between the two metering pumps is retained as a result of pressure from the pump (or a corresponding pressure) acting on the shut-off valve. In emergency operation, however, the connection between the two metering pumps remains interrupted, irrespective of any other disruptions.

In an especially preferred construction, the safety valve arrangement has a non-return valve which closes in the direction of the control inlet of the shut-off valve. The non-return valve allows hydraulic fluid to flow without difficulty from the pump connection to the directional valve. It does not, however, allow flow in the opposite direction and thus does not allow pressure to be transmitted in the opposite direction towards the control inlet of the shut-off valve. The non-return valve operates automatically, that is to say no additional measures need to be taken in the event of pressure failure at the pump connection in order to make the necessary interruption to the control inlet of the shut-off valve.

Advantageously, the non-return valve is arranged in a line from the pump connection to the directional valve. The non-return valve can thus carry out two functions. Firstly, it safeguards the control inlet of the shut-off valve against pressure surges. Secondly, in the event of a drop in pressure at the pump connection, it closes the path to that pump connection so that the amount of fluid conveyed from the metering pump(s) is supplied directly to the steering motor.

In an alternative or additional construction, the safety valve arrangement can have an interrupter valve in a spur line between the control inlet and the line from the pump connection to the directional valve. That interrupter valve can be actuated automatically, for example in dependence on preselectable parameters, such as vehicle speed, vehicle loading or the like, or it can be operated manually if the operator wishes to work with only one metering pump instead of with two. Such an operating method may be desired, for example, in the case of self-driving work machines, for which different steering characteristics are required when driving on roads rather than on site.

Preferably, the shut-off valve has a slide member which is arranged to be acted upon by pressure prevailing in the control inlet and has axially running axial grooves which, in one working position of the slide member, connect the connections of the first metering pump to the corresponding connections of the second metering pump, the slide member having an apron, extending beyond the axial grooves, with a length that is greater than the axial extent of channels leading to the connections of the second metering pump.

The construction of the shut-off valve and slide member is already known from DE 22 28 531 C2 mentioned above. The apron, that is to say the axial projection beyond the grooves, there serves only to close the grooves. It is, however, too short to close the channels completely, or more precisely to close completely their opening into the chambers receiving the slide member. In an intermediate position of the slide member, a short-circuit can therefore occur from the pump connection to the tank connection, which does not result in increased resistance to turning the steering hand wheel, but rather in the exact opposite. For a short time, the operator turns the steering hand wheel virtually with no load because the fluid conveyed by the metering pump flows away directly to the tank. Such short-term relieving of the load is just as unpleasant for the operator as sudden loading.

If the shut-off valve has a second control connection connected to the tank connection, the slide member preferably isolates the second control connection from all other connections of the shut-off valve. In emergency operation, the first metering pump may have to draw fluid in through the tank connection. That can produce a change in pressure in the tank connection. A change in pressure is also to be expected if the amount of fluid flowing back from the other working connection flows away through the tank connection, especially if the line to the tank is of no longer insignificant length. If a connection between the second control connection and the other connections of the shut-off valve is then permitted, the changes in pressure in the tank line are transmitted to the other connections also. That is the case, for example, in the shut-off valve according to DE 22 28 531 C2. There, those changes in tank pressure are transmitted to the second metering pump. Since, however, the second metering pump is coupled mechanically to the first metering pump, there can, under unfavourable circumstances, in that case also be unpleasant mechanical feedback on the operation of the metering pump. If, however, the slide member isolates the tank connection from all other connections, that transmission of pressure is reliably prevented.

It is also preferred for the apron of the slide member to have a peripheral circumferential groove which, in another working position, connects all the connections of the second metering pump to one another. Accordingly, hydraulic resistance, which can otherwise build up in the second metering pump, is eliminated. Hydraulic fluid, which is displaced from chambers of the second metering pump of decreasing size, can flow without difficulty into chambers of increasing size. That also renders working with the control arrangement more pleasant.

If it is desired to eliminate only some of the disruptions, the slide member can also be constructed without the safety valve arrangement at the other control inlet of the shut-off valve.

Advantageously, the spacing between the circumferential groove and the axial grooves is slightly larger than the axial longitudinal extent of the channels, the difference being of the order of magnitude of one tenth of a millimeter. The risk of the second metering pump being blocked hydraulically by the apron as a result of complete covering over of the opening of the channels, and thus being mechanically blocked, which would result in a blockage of the entire control unit because of the mechanical coupling of the first and second metering pumps, is, as a result, negligibly small. Even very small displacements of the slide member are sufficient to eliminate that blockage if it should occur, which is improbable.

In a construction in which a dynamically-operated load pressure control line is connected to the directional valve and to a pressure control device connected after a pump, advantageously a non-return valve which opens in the direction of the directional valve is provided in the load pressure control line. That prevents pressure surges from being transmitted to the control input of the shut-off valve. Those pressure surges could otherwise result in the two metering pumps being connected to one another again, which should be avoided. The non-return valve does not otherwise cause further disruption because the load pressure control line is dynamically operated as is known, for example, from DE 38 14 508 A1.

Preferably the first metering pump has a smaller volumetric output than the second metering pump which is able to be turned off. In emergency operation, in which the first metering pump only is to be used, it is more acceptable that the operator has to carry out a larger number of movements than that those movements require an increased expenditure of effort. As a result of the fact that the first metering pump has a smaller volumetric output, that task is fulfilled by simple means. In normal operation, in which the two metering pumps are operated in parallel, the volumetric output required is obtained by the sum of the two individual outputs. In emergency operation, however, less than half of the volumetric output is used. That means that the operator uses less effort in emergency operation.

The smaller volumetric output of the first metering pump can be achieved simply in that the first metering pump has a shorter axial length than the second metering pump. The other parameters of the metering pump can be left unaltered, especially the diameter and the number of teeth. Accordingly, both metering pumps can, as before, be housed in the same housing and coupled to one another by a common shaft.

BRIEF DESCRIPTION OF THE DRAWINGS

The invention is explained hereinafter with reference to a preferred embodiment, in conjunction with the drawings, in which.

DESCRIPTION OF AN EXAMPLE EMBODYING THE BEST MODE OF THE INVENTION

Figure 1:
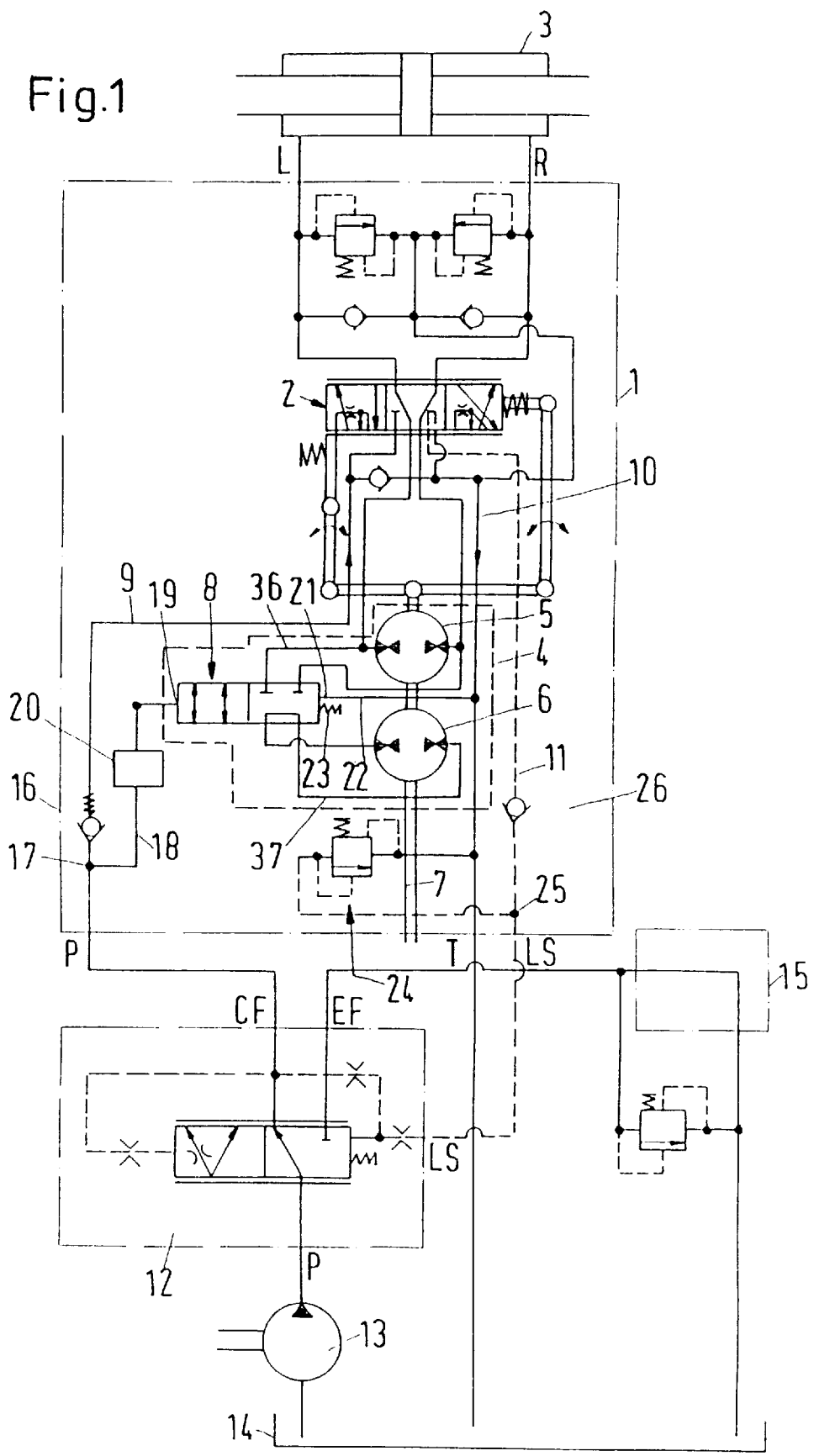
FIG. 1 is a schematic circuit diagram of the control arrangement.

A control arrangement 1 has a directional valve 2 which is connected to two working connections L, R, to which a working motor 3 is connectible.

The other side of the directional valve 2 is connected to a metering pump unit 4, which has a first metering pump 5 and a second metering pump 6 which are connected hydraulically in parallel and are operable mechanically in parallel by means of a common shaft 7.

The expression, that the first and the second metering pumps 5, 6 are connected hydraulically in parallel, means that the inlet connection of the metering pump 5 is connected, or can be connected, to the corresponding inlet connection of the second metering pump 6 and the outlet connection of the metering pump 5 is connected, or can be connected, to the corresponding outlet connection of the second metering pump 6. The metering pump unit 4 also has a shut-off valve 8 which can interrupt that connection between the first metering pump 5 and the second metering pump 6. In the position shown in FIG. 1, the connection is interrupted and the second metering pump 6 is short-circuited so that, when the shaft 7 is turned, only the first metering pump 5 is in a position to convey hydraulic fluid to the directional valve 2.

In addition, on the side of the directional valve 2 that faces the metering pump unit 4, lines 9, 10 are also connected to the directional valve, which lines lead respectively to a pump connection P and a tank connection T. Furthermore, a load pressure control line 11 is provided which leads to a load pressure control connection LS.

The pump connection P and the load pressure control connection LS are connected in known manner to a priority valve 12, to the inlet of which a pump 13 is connected. The pump 13 draws hydraulic fluid from a tank 14, into which a line from the tank connection T is directed. A further hydraulic working unit 15, shown only schematically, is connected to the priority valve 12.

Arranged in the line 9 between the pump connection P and the directional valve 2 is a non-return valve 16 which opens in the direction of the directional valve 2. At a junction point 17 between the non-return valve 16 and the pump connection P, a control line 18 branches off to a control inlet 19 of the shut-off valve 8. Arranged in the control line 18 is an interrupter valve 20, with which the control line 18 can be interrupted. The opposite side of the shut-off valve 8 has a second control inlet 21 which is connected to the line 10 to the tank connection T by way of a second control line 22. On that side, the shut-off valve 8 is also biased by a spring 23. The spring 23 urges the shut-off valve 8 to a position in which the two metering pumps 5, 6 are not connected to one another.

Furthermore, the control arrangement 1 can also comprise a pressure-relief valve 24 which connects the load pressure control line 11 to the tank line 10.

Arranged in the load pressure control line 11, before a branch 25 to the pressure-relief valve 24, is a non-return valve 26 which opens in the direction of the directional valve 2.

Figure 2:
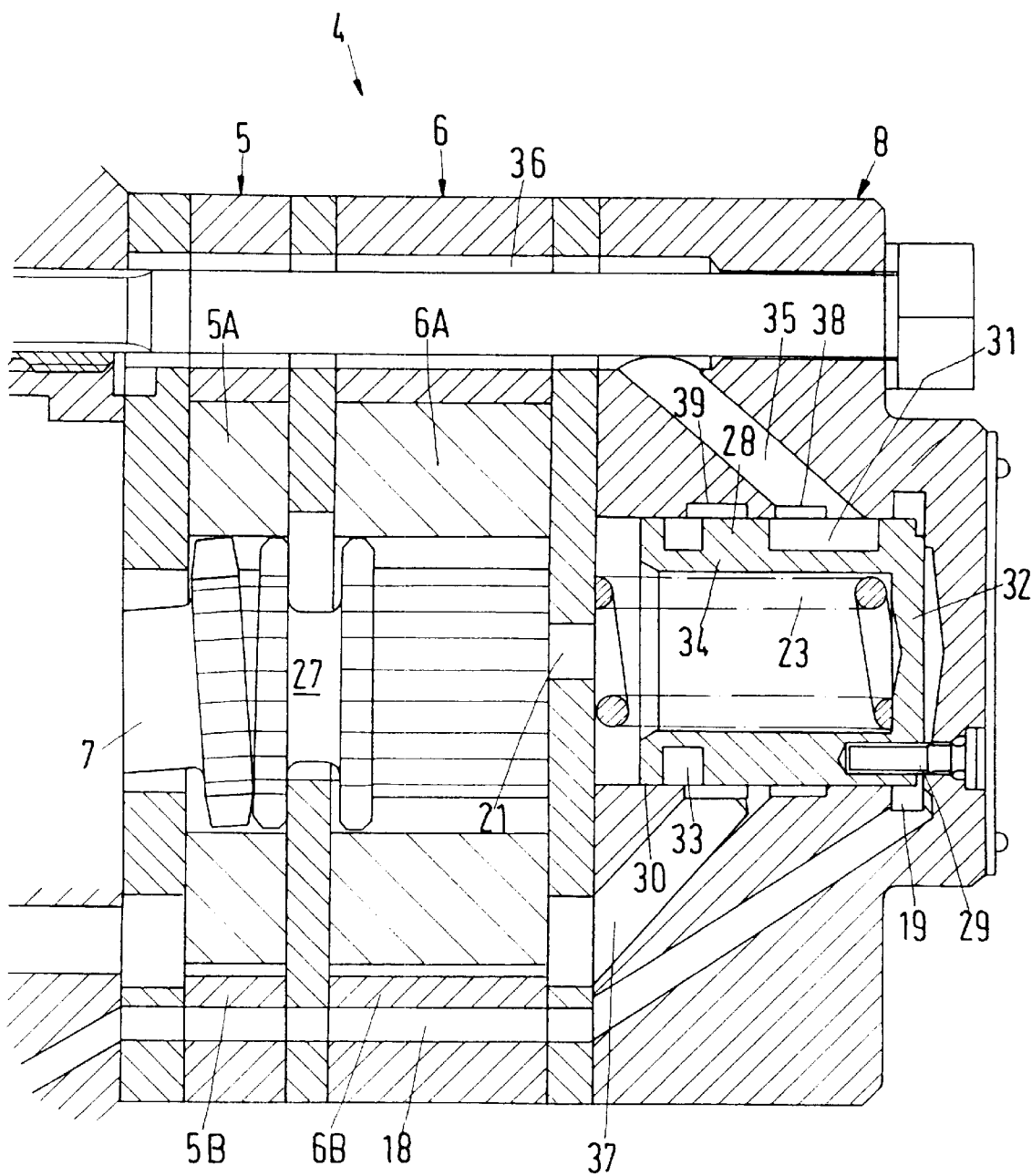
FIG. 2 is a schematic cross-section through a metering arrangement.

FIG. 2 shows the construction of the metering pump unit 4 in more detail. Clearly visible are the first metering pump 5 and the second metering pump 6, each of which has a respective gear wheel assembly 5A, 5B and 6A, 6B. Both gear wheel assemblies have the same diameter and are identically aligned with respect to one another. The gear wheel assembly 5A, 5B, however, has a smaller axial dimension than the gear wheel assembly 6A, 6B of the second metering pump. Accordingly, the first metering pump 5 also has a smaller output than the second metering pump 6, that is to say it delivers less fluid than the second metering pump 6 for the same angle of rotation. The mechanical connection between the two gear wheel assemblies is produced by means of a shaft 27.

The shut-off valve 8 is shown in FIG. 2 on the right-hand side of the metering pump unit 4. The control line 18 leads to the control inlet 19. The pressure building up in the control inlet 19 acts upon an end face of a valve slide member 28, which is pushed to the left against the force of the spring 23. The second control connection 21 is shown only in schematic form. It is connected, in a manner not shown, to the control line 22.

The slide member 28 is in the form of a hollow cylinder closed on one side. By means of a rotation-preventing device 29, it is held non-rotatably, but axially displaceably, in its housing 30.

The outside of the slide member 28 has several circumferentially-running and axially-extending axial grooves 31 and, in the region of the end that faces in the opposite direction to the closed side 32 of the slide member 28, has a circumferentially-running circumferential groove 33. The circumferential groove 33 is provided in a portion of the slide member 28 referred to as an apron 34, which portion extends to the left away from the axial grooves 31, and therefore projects beyond them axially.

Several channels, namely a pump channel 35, which is connected to the first metering pump by a connecting channel 36, and a supply channel 37, which leads to the second metering pump, open into the inner wall of the housing 30. Owing to the view in section of the metering pump unit 4, only one of each of those channels is visible. Such pump and supply channels 35, 37 are, however, present in the circumferential direction for all the chambers of the gear wheel assemblies 6A, 6B and 5A, 5B.

The pump channel 35 is connected to a pump groove 38. The supply channel 37 is connected to a supply groove 39. When the control inlet 19 is acted upon by pump pressure, the slide member 28 is displaced against the force of the spring 23, that is to say, in the drawing according to FIG. 2, to the left, and in the drawing according to FIG. 1, to the right, so that the axial grooves 31 bring the pump grooves 38 and the supply grooves 39 into hydraulic connection with one another. The inlets and outlets of the second metering pump 6 are then connected to the corresponding inlets and outlets of the first metering pump. The two pumps 5, 6 then work in parallel.

If, on the other hand, the pressure at the control inlet 19 is not strong enough to overcome the force of the spring 23, the slide member 28 then moves to the position shown in FIG. 2. There, the apron 34 is large enough, that is to say it extends axially far enough, to cover the supply groove 39 completely. Thus, a short-circuit to the tank pressure which prevails inside the hollow slide member 28 cannot occur. The supply grooves 39 of all the chambers are short-circuited by way of the circumferential groove 33 so that the second metering pump 6 operates virtually with no load, without any significant losses.

The control arrangement 1 functions as follows: as long as there is pump pressure at the pump connection P, the control arrangement can operate normally with two metering pumps connected in parallel, as long as the interrupter valve 20 has not interrupted the control line 18. The operator may desire such an interruption, for example, if he wishes to obtain more sensitive steering. The interrupter valve 20 can also be controlled in dependence on speed. As long as there is sufficient pressure at the control inlet 19, the two metering pumps 5, 6 are, in any case, connected in parallel. They serve only to meter the fluid drawn in at the pump connection P and conveyed to the working motor 3, that is to say to determine the amount thereof.

If, however, the pressure at the pump connection P falls, the pressure at the control inlet 19 falls correspondingly and the slide member 28 blocks the connection between the two metering pumps 5, 6. It simultaneously short-circuits the second metering pump 6 and isolates it from the tank connection T. All pressure fluctuations or surges that can occur in the pump line 9 or in the tank line 10 or in the load pressure control line are reliably withheld from the control inlet 19 by way of the non-return valve 16. The shut-off valve 8 remains closed, irrespective of what loads are acting from the outside or from the inside on the working connections L, R and on the lines connected thereto.

It is possible to depart, in many respects, from the construction shown. The drawing shows the shut-off valve 8 flange-mounted on the metering pumps 5, 6. It may, of course, alternatively be provided in its own housing and may be connected to the metering pumps 5, 6 by way of external lines.

We claim:

1. Hydraulic control unit having a directional valve, a metering pump unit which has two metering pumps that are connected hydraulically in parallel and are operable mechanically in parallel, and a shut-off valve in a hydraulic connection between the two metering pumps, a pump connection and a tank connection which are connected to the metering pump unit by way of the directional valve and two working connections which are connected to the directional valve, a control inlet of the shut-off valve being connected to the pump connection, and including a safety valve arrangement located between the control inlet of the shut-off valve and the directional valve.

2. Control unit according to claim 1, in which the safety valve arrangement comprises a non-return valve which closes in the direction of the control inlet of the shut-off valve.

3. Control unit according to claim 2, in which the non-return valve is located in a line leading from the pump connection to the directional valve.

4. Control unit according to claim 1, in which the safety valve arrangement comprises an interrupter valve in a spur line between the control inlet and a line leading from the pump connection to the directional valve.

5. Control unit according to claim 1, in which the shut-off valve has a slide member which is arranged to be acted upon by a pressure prevailing in the control inlet and which has axially running axial grooves which, in one working position of the slide member, connect the connections of the first metering pump to corresponding connections of the second metering pump, the slide member having an apron, extending beyond the axial grooves, with a length that is greater than the axial extent of channels leading to the connections of the second metering pump.

6. Control unit according to claim 5, in which the shut-off valve has a second control connection which is connected to the tank connection, the second control connection being isolated from all other connections of the shut-off valve by the slide member.

7. Control unit according to claim 5, in which the apron of the slide member has a peripheral circumferential groove which, in a second working position, connects all the connections of the second metering pump to one another.

8. Control unit according to claim 7, in which spacing between the circumferential groove and the axial grooves is slightly larger than the axial longitudinal extent of the channels.

9. Control unit according to any claim 1, in which a dynamically-operated load pressure control line is connected to the directional valve, which load pressure control line is connected to a pressure control device connected after a pump, including in the load pressure control line a non-return valve which opens in the direction of the directional valve.

10. Control unit according to claim 1, in which the first metering pump has a smaller volumetric output than the second metering pump, and including means to turn off the second metering pump.

11. Control unit according to claim 10, in which the first metering pump has a shorter axial length than the second metering pump.

\* \* \* \* \*